United States Patent [19]

Birmingham et al.

[11] Patent Number: 5,783,776
[45] Date of Patent: *Jul. 21, 1998

[54] ELECTRICAL CABLE PENETRATION SEAL WITH COMPLIANT MODULE

[75] Inventors: John A. Birmingham, Broken Arrow; Rogers A. Moore, Afton, both of Okla.

[73] Assignee: O-Z Gedney Company LLC, Farmington, Conn.

[*] Notice: The term of this patent shall not extend beyond the expiration date of Pat. No. 5,416,271.

[21] Appl. No.: 391,888

[22] Filed: Feb. 21, 1995

Related U.S. Application Data

[63] Continuation-in-part of Ser. No. 237,972, May 4, 1994, Pat. No. 5,416,271, which is a continuation of Ser. No. 784,295, Oct. 29, 1991, abandoned.

[51] Int. Cl.⁶ .................................................. H02G 3/18
[52] U.S. Cl. ................................................. 174/64 R
[58] Field of Search ............................. 174/65 R, 48, 174/76, 77 R, 93, 99 R, 65 SS; 428/312.8, 312.2, 312.6; 248/56, 68.1; 439/465, 466, 469, 472, 473, 604, 606

[56] References Cited

U.S. PATENT DOCUMENTS

| | | | |
|---|---|---|---|
| D. 249,558 | 9/1978 | Blomquist | D25/35 |
| D. 249,559 | 9/1978 | Blomquist | D25/35 |
| D. 253,554 | 11/1979 | Blomquist | D25/117 |
| 1,603,991 | 10/1926 | Smithers | 138/89 |
| 1,851,940 | 3/1932 | Williams | 138/89 |
| 1,947,481 | 2/1934 | Meyer | 174/22 R |
| 2,732,226 | 1/1956 | Brattberg | 285/192 |
| 3,282,544 | 11/1966 | Brattberg | 248/56 |
| 3,489,440 | 1/1970 | Brattberg | 403/192 |
| 3,569,608 | 3/1971 | Ance | 174/93 |
| 3,607,604 | 9/1971 | Nava | 101/161 |
| 3,655,907 | 4/1972 | Philbert | 174/77 R |
| 3,879,575 | 4/1975 | Dobbin et al. | 174/92 |
| 3,889,047 | 6/1975 | Carver | 174/84 R |
| 4,291,195 | 9/1981 | Blomqvist | 174/98 |
| 4,461,529 | 7/1984 | Fariss | 439/604 |
| 4,656,313 | 4/1987 | Moore et al. | 174/35 R |
| 4,677,253 | 6/1987 | Blomqvist | 174/35 R |
| 4,733,016 | 3/1988 | Twist et al. | 174/65 R |
| 4,767,086 | 8/1988 | Blomqvist | 248/56 |
| 4,849,580 | 7/1989 | Reuter | 174/92 |
| 5,037,318 | 8/1991 | Robertson | 439/98 |
| 5,416,271 | 5/1995 | Birmingham et al. | 174/65 R |

Primary Examiner—Kristine L. Kincaid
Assistant Examiner—Joseph Waks
Attorney, Agent, or Firm—Robert S. Smith

[57] ABSTRACT

An electrical cable penetration seal apparatus which includes a compliant module having an inner and outer regions of different durometer characteristics. In some forms of the invention the outer regions are generally planar and disposed on opposed sides of the compliant module. The outer regions have are manufactured of a relatively high durometer elastomer and an inner region which is made from a lower durometer elastomer.

20 Claims, 2 Drawing Sheets ered in the Brattberg U.S. Pat. Nos. 2,732,
ELECTRICAL CABLE PENETRATION SEAL WITH COMPLIANT MODULE

RELATED APPLICATIONS

This application is a continuation-in-part of allowed U.S. patent application Ser. No. 08/237,972 filed May 4, 1994, now U.S. Pat. No. 5,416,271, which was a continuation of abandoned U.S. patent application Ser. No. 07/784,295 filed on Oct. 29, 1991 now abandoned.

BACKGROUND OF THE INVENTION

The invention relates to devices used to facilitate fire-resistant, pressure-tight penetrations of decks, bulkheads, walls, floors, and similar partitions. More particularly, the invention relates to a novel elastomeric module for use in fire-rated electrical cable penetration seal devices and which provides improved pressure sealing and closer conformance to the outside surface of a cable, while maintaining the fire resistance of traditional modules. It will be understood that the apparatus in accordance with the invention must function in a demanding ambient. Thus, it will be apparent that prior apparatus that uses soft gels to cushion the connection of two wires could not possibly sustain the pressure required much less survive a fire and continue to function as the present invention is required to do.

Although the invention will be described primarily in terms of electrical power, control and communications cables it will be understood that the same apparatus will also have application to other penetrating elements. Known seal devices are described in the Brattberg U.S. Pat. Nos. 2,732,226; 3,282,544; and 3,489,440 and other patents, and are generally known as through-penetration firestop devices or transits.

Typically these devices comprise a plurality of rubber modules. Each module is ordinarily designed to fit closely around one cable. The modules are retained in a frame which is attached to the deck, bulkhead, wall, floor, or similar partition. The frame is most commonly steel, but may be manufactured of other materials. Each rubber module is typically molded in two halves. Each half is commonly symmetrical about a plane extending through the axis of both the cable and the module. The halves form a block with a cylindrical center passage. The modules are molded in various sizes to cover the range of cable diameters. The rubber is typically controlled to a durometer hardness range of 65 to 80, to ensure mechanical stability when subjected to high pressures. Accessory items are furnished to anchor rows of modules in place, and to close the final opening in the frame while putting the modules in compression.

Transit devices or systems are used whenever there is a fairly large cable population to be accommodated in a limited space. For example, naval ships are divided into compartments by water-tight, fire-resistant bulkheads as protection in the event of damage to their hulls, such as by mines, torpedoes, or submerged objects. A pressure-tight, fire resistant seal is required to permit electrical cables to enter or pass through these compartments.

There are several factors that influence the quality of the fit between a module and the cable disposed in that module. Obviously, the fit is dependent, in part, on the compression and retention of the assembly of modules in the supporting frame. The present invention is directed to accommodating the variations in cables. Cables usually are not perfectly round or straight, and their diameters are neither uniform nor exact. Since modules must be molded in discrete sizes, a perfect fit is improbable. In the past, cable jackets have been relatively soft and compliant. The rubber module and cable jacket have been capable of mutual deformation, so that a close fit develops when the system is put in compression.

Improvements in cable jacket and insulation materials in recent years have concentrated on fire performance. New materials have been introduced with low flame spread and smoke emission characteristics. Cable jackets made with these materials are significantly harder and more rigid than earlier PVC jackets. The stiffness of the new jacket materials has made it more difficult to obtain a close fit between a module and a cable. While it might appear that reducing the hardness of the module would produce a compensating ability to conform to cable variations, this approach has proved impractical. When the modules are made sufficiently soft, the column strength of the rubber mass under compression is too low for stability, resulting in excessive deformation of the modules and leakage at lower pressures.

One solution to this problem is to provide modules with interior grooves or contours, creating multiple diameters. The effect of this design is to reduce the bearing surface of the module on cable, increasing the force available to produce mutual deformation. In this way it is possible to maintain good pressure tightness, but at the price of much higher local stress concentration on the cable jacket. The long term effect on cable jacket performance is not known, but believed to be adverse.

Another solution is to devise a module with layers that can be peeled off to tailor the groove diameter to the specific cable dimension. This design has the advantage of minimizing inventory requirements, but puts heavy responsibility on the installer to remove the correct number of layers, and creates a cleanup and disposal problem as the individual layers are discarded.

It is an object of the invention to provide a more intimate fit in a through-penetration firestop device or transit between the individual modules and the respective cables they enclose.

A related object of the invention is to improve the fluid pressure seal and thus reduce passage of noxious or explosive fluids and particularly gases between compartments even if the cable jacket is of unusual or irregular shape or design.

It is an object of the invention to provide apparatus which is inexpensive to manufacture as well as requires a minimum of labor to install.

Still another object of the invention is to provide an optimum combination of the advantages of the low durometer elastomer to conform to variations in cable jacket shape or dimension with a high durometer elastomer for mechanical strength and stability.

Yet another object of the invention is to accommodate a wider range of cable diameters than would be possible with ordinary modules of prior design, thus reducing both inventory and tooling requirements.

Yet another object of the invention is to simplify installation requirements by accommodating non-compliant or irregularly shaped penetrating items.

It is also an object of the invention to provide a structure which, when exposed to fire conditions, expands to close apertures caused by burning away of cable jackets.

Another object of the invention is to minimize cable jacket compression that could lower the dielectric strength of the cable jacket material.

SUMMARY OF THE INVENTION

It has now been found that these and other objects of the invention may be attained in an electrical cable penetration seal apparatus which includes an electrical cable penetration seal apparatus for cooperation with a plurality of associated cables which includes a plurality of compliant modules. Each compliant module has a generally rectangular inner region in which a passageway is defined that is dimensioned and configured to surround one of a plurality of associated cables. Each of the modules has first and second outer opposed generally planar regions disposed on opposed sides of the inner region. The inner region is manufactured of an elastomer having a first durometer characteristic and the outer region being an elastomer having a second durometer characteristic. The apparatus also includes means for securing the plurality of compliant modules together. Each of the outer regions in each of the compliant modules having a higher durometer characteristic than the inner region within any one compliant module, each of the inner regions having a durometer characteristic in the range of 25 to 45.

In some forms of the invention the inner region has a durometer characteristic that is substantially 35. The outer regions may have a durometer characteristic that is in the range of 65 to 80 although the durometer characteristic may be in the range of 70–75.

The outer regions may have a thickness in the range of 0.5 to 4 millimeters and in some case be about 3 millimeters. Some forms of the invention may have the outer region manufactured of an intumescent material although in other forms of the invention the outer region is manufactured of a non-intumescent material. Similarly, the inner region may be manufactured of an intumescent material, although in other forms of the invention the inner region is manufactured of a non-intumescent material.

BRIEF DESCRIPTION OF THE DRAWING

The invention will be better understood by reference to the accompanying drawing in which.

DESCRIPTION OF THE PREFERRED EMBODIMENT

Figure 2:
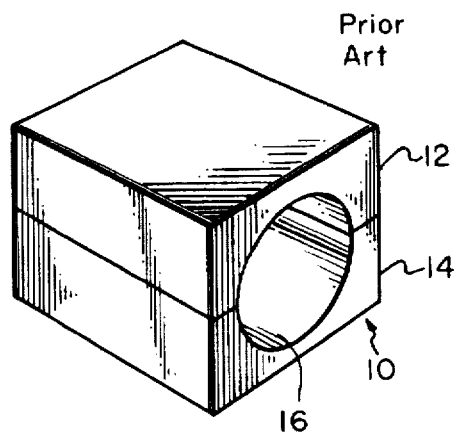
FIG. 2 is a perspective view of a prior art module.

In general the prior art sealing modules 10, as shown in FIG. 2, consist of elastomeric blocks separated into two mating halves 112, 114 with a central groove or passage 16 dimensioned to accommodate pipes or cables and an outer surface dimensioned and configured to permit multiple modules 10 to be held under compression in a frame (not shown). The central passage or groove 16 is most often cylindrical, but may be rectangular or otherwise shaped to conform to the penetrating item. The outside shape is most often rectangular, but may also be hexagonal or round, as determined by the design of the containing frame.

Figure 3:
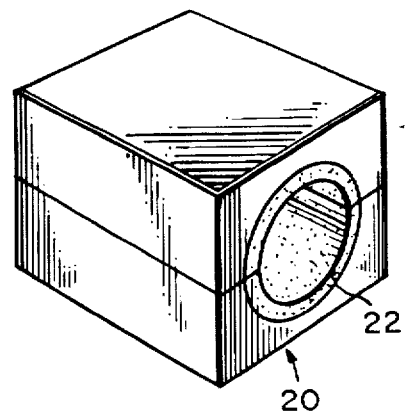
FIG. 3 is a perspective view of a compliant module in accordance with one form of the invention.

Referring now to FIG. 3 there is shown an improved form of transit module, known as a compliant module 20, in accordance with one form of the invention. A plurality of such modules are included in the frame 30 shown in FIGS. 1, 4, and 5. This assembly will be described in greater detail hereafter.

The compliant module 20 is manufactured of an elastomeric material which may be rubber, such as neoprene, chloroprene, or EPDM, or it may be some other polymeric material. "Intumescence," as applied to fire protective materials, is a chemical process taking place at elevated temperatures, usually in the range of 250 degrees F. to 400 degrees F., which results in an increase in volume accompanied by the formation of an insulating char. Various chemical reactions, all well known in the literature, are employed to achieve intumescent properties.

Compliant modules 20 are designed with outside dimensions in suitable multiples of standard dimensions, to facilitate installation of numerous penetrating items through single frame openings. When the modules use a square face, it is customary to designate the module by its outside dimension and the groove diameter.

The compliant module 20 in accordance with the preferred form of the invention, as best seen in FIG. 3, differs from the known module 10 because of the planar regions 22, 22 at the top and bottom of the module 20. The regions 22 create a "sandwich" with respect to the mating halves 12, 14. Ordinarily, the halves 12, 14 are manufactured of a relatively low durometer elastomer. It will be understood that the mating inner halves 12, 14 surround the penetrating item and thus advantageously are made of a relatively low durometer elastomer. This low durometer or "soft" region permits the module 20 to conform readily to variations or irregularities in the shape or dimensions of the penetrating item.

The remainder of the module 20, namely the outer regions 22, 22 are manufactured of a more conventional durometer hardness. The hardness in the outer regions 22, 22 are essential to provide structural rigidity for the module 20. Ordinarily the mating halves 12, 14 constituting the inner region have a cylindrically shaped groove 16 therein although other shapes may be used. For example, if the penetrating item has a rectangular shape the region 22 may be also have a rectangular outer and inner cross section. For simplicity the description will refer to cylindrical shapes even though other forms are contemplated by the present invention.

Merely for ease of description, the halves 12, 14 will be described as if they were discrete elements that are not integral with respective regions 22, 22. Those skilled in the art will recognize that the regions may be molded as integral parts of the halves even though for ease in describing the structure they are described as discrete parts. In the preferred form of the invention the regions 22 are integral part although those skilled in the art will also understand that the regions 22 may be discrete elements. It will also be understood that the appearance of the module and the generally planar shape of the regions 22, 22 lends itself to being described as a "sandwich" construction.

In the preferred form of the invention the compliant module has outer regions 22 manufactured of an intumescent neoprene (or chloroprene-based rubber) and an inner region, comprising the mating halves 12,14, manufactured of a low durometer intumescent rubber. For other applications, the inner region may be manufactured of a non-intumescent material. The regions 22 preferably have a durometer of about 65 as measured on the Shore A hardness scale. For various applications the regions 22 will have a durometer in the range of 65 to 80. Preferably, the regions 22 have a thickness of about 3 millimeters although for some applications the thickness will vary from 0.5 to 4 millimeters.

The inner region defined by the mating halves 12, 14 will preferably have a durometer rating of about 35, as measured on the Shore A hardness scale. The hardness will of course vary with the application. In other embodiments, for the durometer may be in the range of 25 and 45. The wall thickness of the halves will vary with the specific application. It has been found by the inventors herein that the desired force distribution, and thus the desired sealing characteristics, to the penetrating item is achieved when the outer region 22 spans the entire face of the module 20 and has a thickness of between 0.5 millimeters and 4 millimeters. In the preferred embodiment the thickness is about 3 millimeters. The entire remaining portion of the module, namely the mating halves 12, 14, are constructed of a relatively low durometer rubber. The ratio of the durometers, that is of the high durometer rubber to low durometer rubber, should preferably be in the order of 2:1. Because the modules 20 are typically molded in with a dimensions in a vertical plane of 15, 20, 30, 40, 60, or 120 millimeters, the height of the low durometer inner region will be the difference between the height of the entire module, less the thickness of the respective upper and lower outer regions 22, 22.

Those skilled in the molding of rubber parts will recognize that some tolerance in hardness values is inevitable.

The two materials may be colored differently to distinguish the higher and lower durometer materials. It will be understood that for simplicity the numerals 12, 14 have been used to identify compliant modules of various sizes having different size channels disposed therein.

The invention provides a novel means of sealing cables, conduit and other penetrating items in an assembly otherwise well known in the industry and exemplified by the sealing systems manufactured by Nelson Fire Stop Products, a Division of O-Z Gedney, a unit of General Signal, Post Office Box 726, Tulsa Okla. 74101, and identified as the "Nelson Multi-Cable Transit System". Such systems are also known by the acronym "MCT". These systems permit the installation of penetrating items in walls, floors, ceilings, ships' bulkheads, decks, and other partitions requiring penetration seals.

Figure 1:
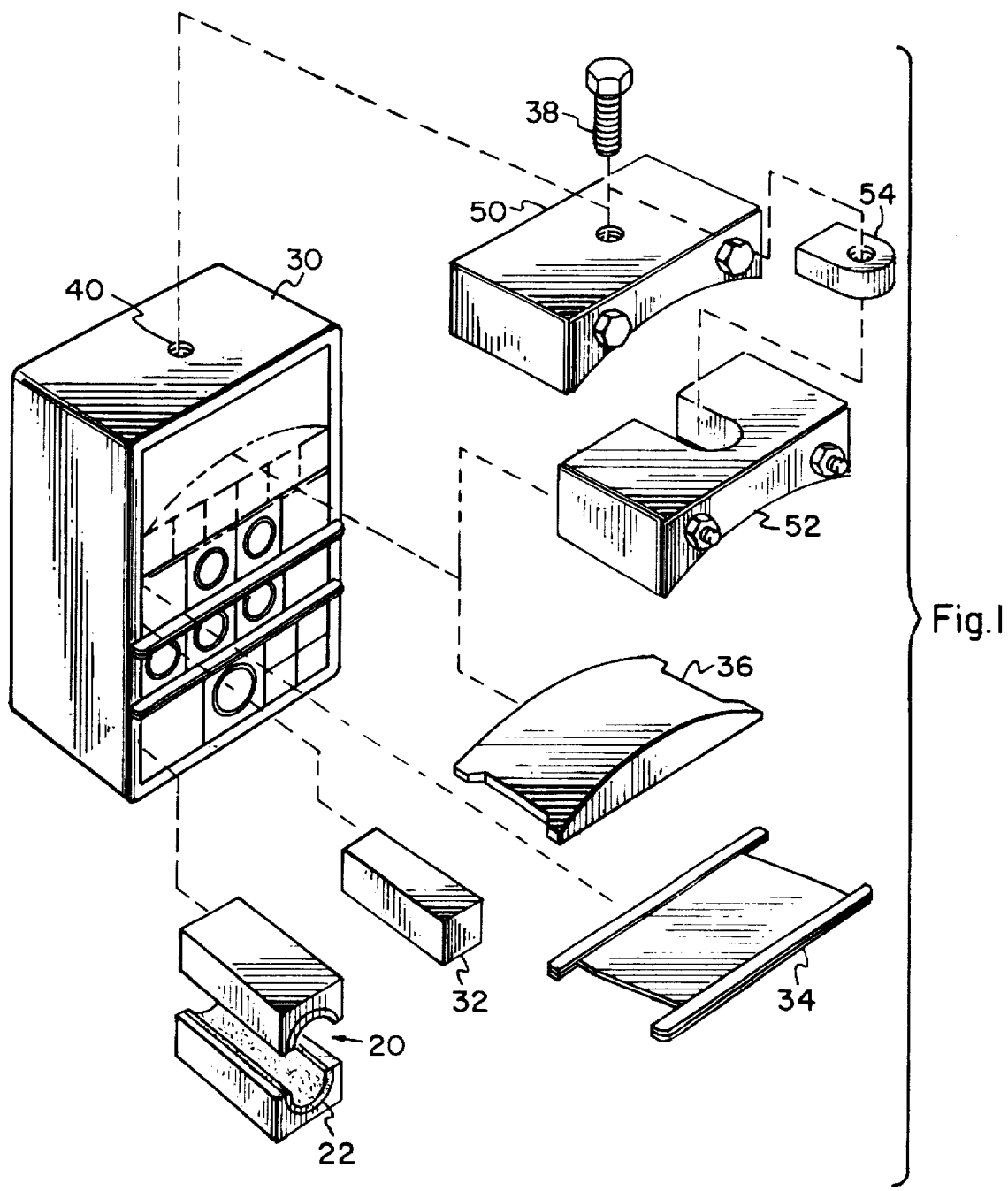
FIG. 1 is an exploded perspective view of an electrical cable penetration seal that includes a plurality of compliant modules in accordance with one form of the invention.
Figure 4:
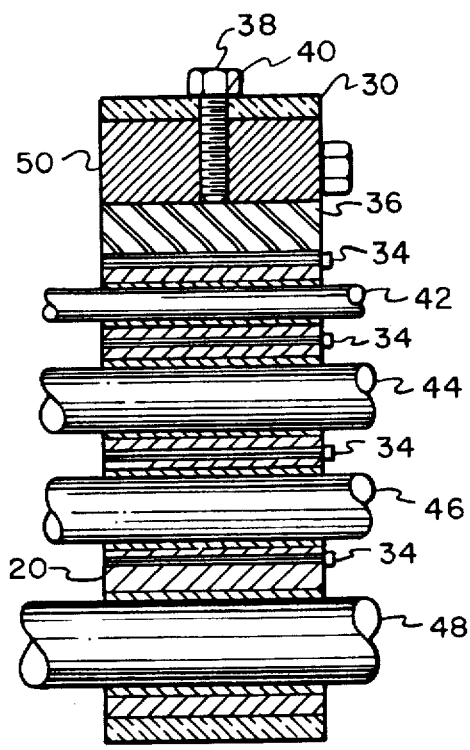
FIG. 4 is a sectional view taken along a vertical plane of the assembly shown in FIG. 1.
Figure 5:
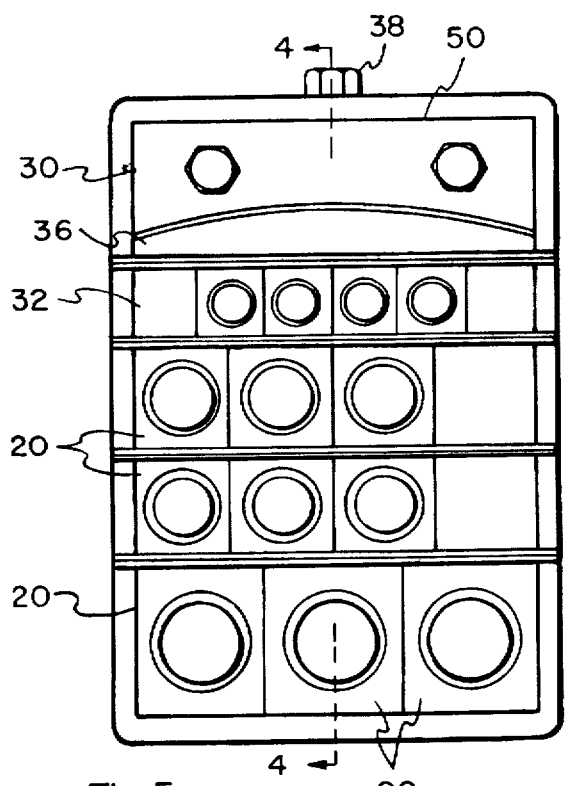
FIG. 5 is a side elevational view of the apparatus shown in FIG. 1.

Referring now particularly to FIGS. 1, 4 and 5 there is shown a typical installation in which a metallic frame 30 is installed with its opening coincident with the opening in the partition (not shown). Rows of compliant modules 20 are positioned across the frame opening. Each module 20 surrounds one cable as shown in FIG. 4. Spare insert blocks 32 fill any unused spaces. The rows of modules 20 are separated by stay-plates 34, which serve to lock the modules 20 in place and stabilize the assembly.

When the frame 30 is filled to capacity, a compression plate 36 is inserted over the top row of modules 20. A compression bolt 38, that passes through a threaded hole 40 in the top of frame 30, is tightened against the compression plate 36, thereby applying a uniform pressure on the complete assembly. The pressure forces all the modules 20 to close tightly around the cables 42, 44, 46, 48 and the rubber parts deform as necessary to close all leakage paths. Either a first alternative end packing 50 or a second alternative end packing comprising elements 52, 54 closes the remaining small opening above the compression plate 36. The second alternative end packing comprising elements 52, 54 is used for those installations where only one face of the assembly is accessible during installation.

The assembly in accordance with the preferred form of the invention has important advantages over known apparatus. More particularly, the resilient halves 12, 14 provide an improved fluid seal that will reduce passage of noxious or explosive fluids, including both liquids and gases, into compartments. The fluid seal prevents such leakage along cable jackets even if they are of unusual or irregular shape or design. The apparatus will also accommodate a wider range of cable diameters than would be possible with ordinary modules of prior design, thus reducing both inventory and tooling requirements. A still further advantage is that the resilient portion eliminates the need for convoluted interior surfaces for sealing that may damage cable jackets. This damage may include physical damage that leads to lower dielectric strength of the jacket material. The invention also simplifies installation requirements by accommodating non-compliant or irregularly shaped penetrating items.

In the preferred form of the invention, a novel feature of the compliant module is that when exposed to a fire condition the elastomer expands to close apertures caused by the burning away of cable jackets. This effect is known as "intumescence."

Two compliant modular systems may be placed in back to back position to increase the advantages. When the compliant module concept in accordance with the invention is applied to EMI/EMP electrical cable penetration seals, the advantage of improved conformance to cable dimensions is obtained without sacrificing EMI/EMP protection. The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention we claim:

1. An electrical cable penetration seal apparatus for cooperation with a plurality of associated cables which comprises:
   a plurality of compliant modules, each compliant module having a generally rectangular inner region in which a passageway is defined, said passageway being dimensioned and configured to surround one of a plurality of associated cables, each of said modules having first and second outer opposed generally planar regions disposed on opposed sides of said inner region, said inner region being an elastomer having a first durometer characteristic and said outer region being an elastomer having a second durometer characteristic; and
   means for securing said plurality of compliant modules together;
   each of said outer regions in each of said compliant modules having a higher durometer characteristic than said inner region within any one of said compliant modules, each of said inner regions having a durometer characteristic in the range of 25 to 45.

2. The apparatus as described in claim 1 wherein:
   said inner region has a durometer characteristic that is substantially 35.

3. The apparatus as described in claim 2 wherein:
   each of said outer regions has a durometer characteristic that is in the range of 65 to 80.

4. The apparatus as described in claim 3 wherein:
   each of said outer regions have a durometer characteristic that is in the range of 70–75.

5. The apparatus as described in claim 4 wherein:
   each of said outer regions have a thickness in the range of 0.5 to 4 millimeters.

6. The apparatus as described in claim 5 wherein:
   each of said outer regions have a thickness of approximately 3 millimeters.

7. The apparatus as described in claim 1 wherein:

said outer region is manufactured of an intumescent material.

8. The apparatus as described in claim 2 wherein:

said outer region is manufactured of an intumescent material.

9. The apparatus as described in claim 3 wherein:

said outer region is manufactured of an intumescent material.

10. The apparatus as described in claim 4 wherein:

said outer region is manufactured of an intumescent material.

11. The apparatus as described in claim 5 wherein:

said outer region is manufactured of an intumescent material.

12. The apparatus as described in claim 6 wherein:

said outer region is manufactured of an intumescent material.

13. The apparatus as described in claim 1 wherein:

said inner region is manufactured of an intumescent material.

14. The apparatus as described in claim 2 wherein:

said inner region is manufactured of an intumescent material.

15. The apparatus as described in claim 3 wherein:

said inner region is manufactured of an intumescent material.

16. The apparatus as described in claim 4 wherein:

said inner region is manufactured of a non-intumescent material.

17. The apparatus as described in claim 1 wherein:

said outer region is manufactured of a non-intumescent material.

18. The apparatus as described in claim 2 wherein:

said outer region is manufactured of a non-intumescent material.

19. The apparatus as described in claim 3 wherein:

said outer region is manufactured of a non-intumescent material.

20. The apparatus as described in claim 4 wherein:

said outer region is manufactured of a non-intumescent material.

* * * * *